US005449482A

United States Patent [19]

Faddar et al.

[11] Patent Number: 5,449,482

[45] Date of Patent: Sep. 12, 1995

[54] METHOD FOR PERFORATING FOIL AND DEVICE USING THIS METHOD

[75] Inventors: Frans M. Faddar, Merksem; Luc Faddar, Rijkevorsel, both of Belgium

[73] Assignee: Machine-Service NV, Naamloze Vennootschap, Loenhout, Belgium

[21] Appl. No.: 197,974

[22] Filed: Feb. 17, 1994

[30] Foreign Application Priority Data

Feb. 17, 1993 [BE] Belgium ............................ 09300148

[51] Int. Cl.[6] ............................................ B23D 25/12

[52] U.S. Cl. ........................................ 264/154; 83/16; 83/24; 83/100; 83/345; 425/290

[58] Field of Search ................ 425/290, 363; 264/102, 264/154; 83/16, 24, 27, 100, 102, 116, 345

[56] References Cited

U.S. PATENT DOCUMENTS

| | | | |
|---|---|---|---|
| 3,031,905 | 5/1962 | Phillips et al. | 83/24 |
| 3,654,829 | 4/1972 | Anderson | 425/290 |
| 3,707,102 | 12/1972 | Huppenthal et al. | 264/154 |
| 4,051,754 | 10/1977 | Harcûba et al. | 425/290 |
| 4,534,248 | 8/1985 | Andersson | 83/24 |
| 4,656,900 | 4/1987 | Herrington | 83/24 |
| 4,671,152 | 6/1987 | Blümle | 83/24 |
| 5,140,880 | 8/1992 | Littleton | 83/100 |

FOREIGN PATENT DOCUMENTS

| | | |
|---|---|---|
| 2378623 | 8/1978 | France . |
| 2392916 | 12/1978 | France . |

*Primary Examiner*—Jay H. Woo
*Assistant Examiner*—Robert B. Davis
*Attorney, Agent, or Firm*—Bacon & Thomas

[57] ABSTRACT

A method for perforating foil includes cutting out subsequent series of perforations with heated bushes, grasping the cut-out discs and removing these discs from the foil from which they have been cut out. A device for carrying out this method utilizes first and second cylinders which are rotated relative to each other with a first one of the cylinders being provided with heated, perforating bushes that are received with holes provided in the second cylinder. Concentric with the holes provided in the second cylinder are nipples. A vacuum source is connected to the nipples such that the nipples can grasp the cut-out discs and then a compressed source is connected to the nipples for easy removal of the discs from the device.

14 Claims, 3 Drawing Sheets

METHOD FOR PERFORATING FOIL AND DEVICE USING THIS METHOD

BACKGROUND OF THE INVENTION

The present invention concerns a method for perforating foil, in particular synthetic foil, such as any so-called stretch foils, high-density foils, foils in polyethylene, in polypropylene, etc.

More in particular, the present invention concerns a method for providing perforations with relatively large dimensions in foils in an efficient and rational manner, for example, in the case of circular perforations, of the size of 6 to 60 mm.

The present invention also concerns a device using the above-mentioned method, as well as foil obtained by means of such method, device respectively.

Until now, no methods, devices respectively, are known for providing relatively large perforations in foil material.

Methods and/or devices are already known, however, for providing relatively small perforations in foil material, in other words, perforations having a maximum diameter of 6 mm.

A first known device for providing such small perforations in foil material consists of a mould through which the foil is lead through, and whereby the lead-through of said foil through the mould happens in steps, in other words whereby the foil must be stopped each time a row of perforations is provided.

This known device can in no way be efficiently used for providing perforations of relatively large dimensions in foil material, since, from the nature of things, it works very slowly on the one hand, and since the discharge of the punched-out discs is difficult, if not impossible, especially when the foil material is very thin, since the discs very often stick to the foil material in this case, either because it has not been entirely cut away, either due to the electrostatic charge in the material, as a result of which the loosened discs remain stuck.

In a second known device, use is made of bullets for providing perforations which are driven with force through a hollow pipe upon which the foil to be perforated is placed.

This second known device has all the above-mentioned disadvantages of the first known device.

In a third known device for providing perforations with a small diameter in foil material, use is made of nails to prick through the foil material.

Besides the above-mentioned disadvantages of the two first known devices, this third device is also disadvantageous in than the perforations are only formed by pricking through the material, such that no real openings are formed.

It is clear that the material obtained by providing small perforations with any of the above-mentioned known devices can only be used in a restricted manner, for example only as agricultural foil, in other words, foil for covering large surfaces.

SUMMARY OF THE INVENTION

The present invention concerns a foil material with large perforations which can be made very easily and quickly and which is mainly meant as packaging material for flowers, plants, vegetables, fruits, food in general, for example food which needs to be frozen, in other words products which require an efficient packaging which also allows for a very efficient and significant aeration of the products.

According to the present invention, a method and device is proposed which makes it possible to provide all possible packaging materials, including very thin foil material, which of course has a very large elasticity, as well as so-called shrink foil, with relatively large perforations, which was until now impossible with the known methods and devices.

The method according to the invention which has the above-mentioned and other advantages mainly consists in cutting out subsequent series of perforations by means of heated bushes; in grasping the cut-out discs; and in thus removing these discs from the foil from which they have been cut out.

A preferred embodiment using the method according to the invention is mainly characterized in that it consists of two cylinders rotating in relation to one another of which one is provided with means to cut out discs from the foil by means of heat, whereas the second cylinder is provided with means which can grasp the cut-out discs.

In order to better explain the characteristics of the invention, a preferred embodiment is described hereafter, as an example only without being limitative in any way, with reference to the accompanying drawings.

DETAILED DESCRIPTION OF THE INVENTION

Figure 1:
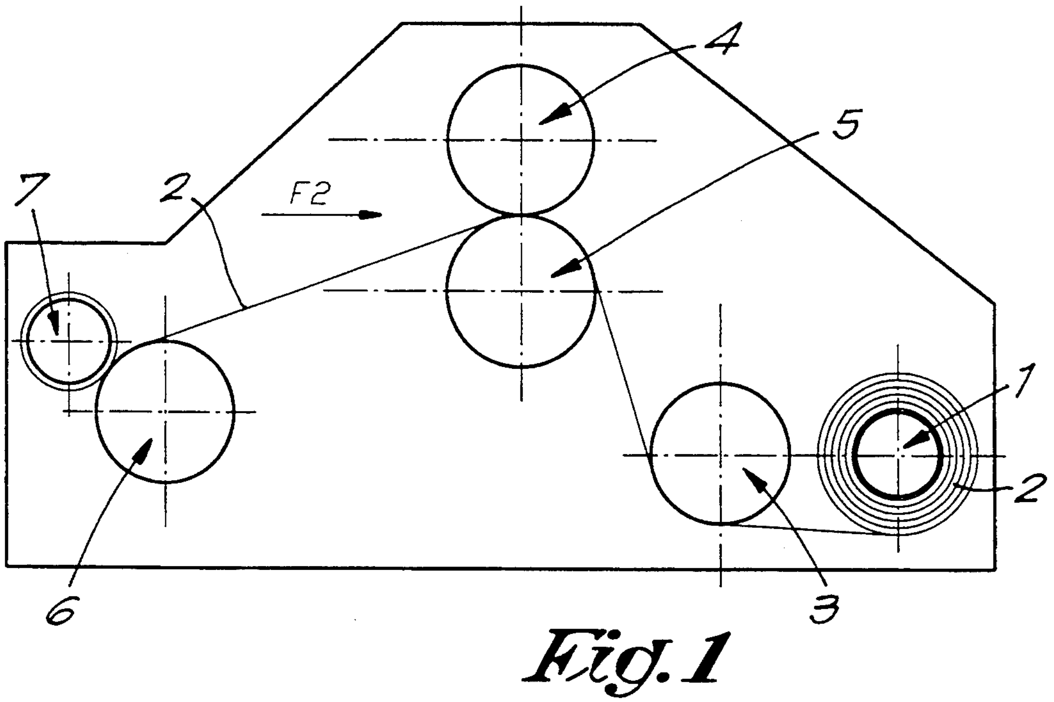
FIG. 1 is a schematic representation of a device using the method according to the invention.
Figure 2:
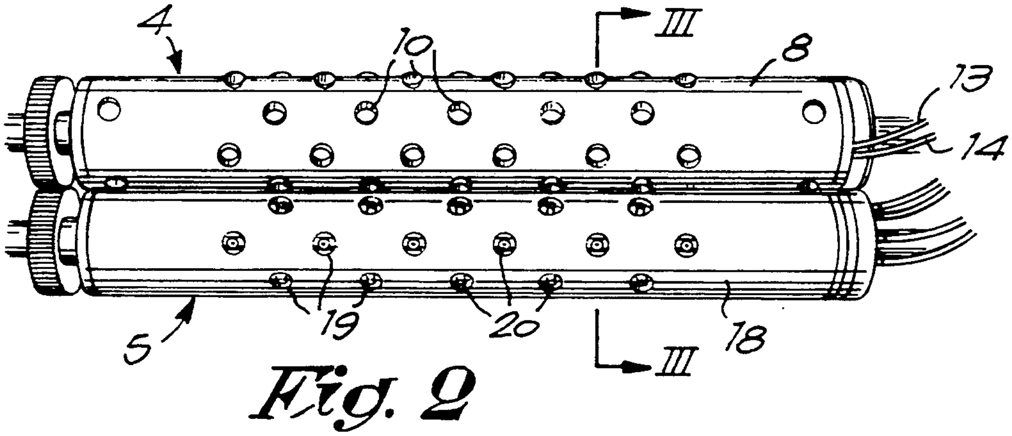
FIG. 2 is a view in perspective according to the arrow F2 in FIG. 1.
Figure 3:
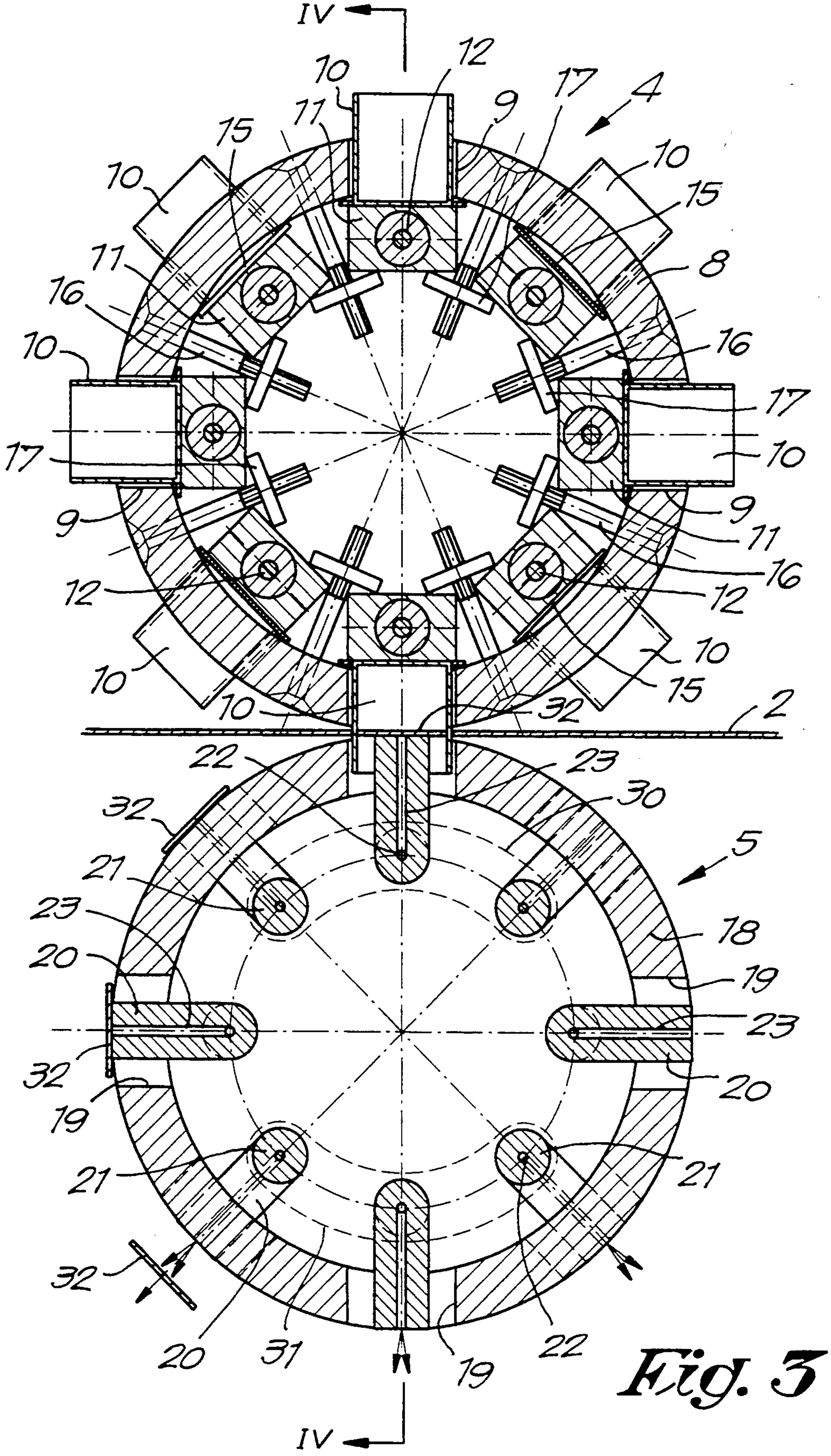
FIG. 3 shows a section according to line III—III in FIG. 2 to a larger scale.
Figure 4:
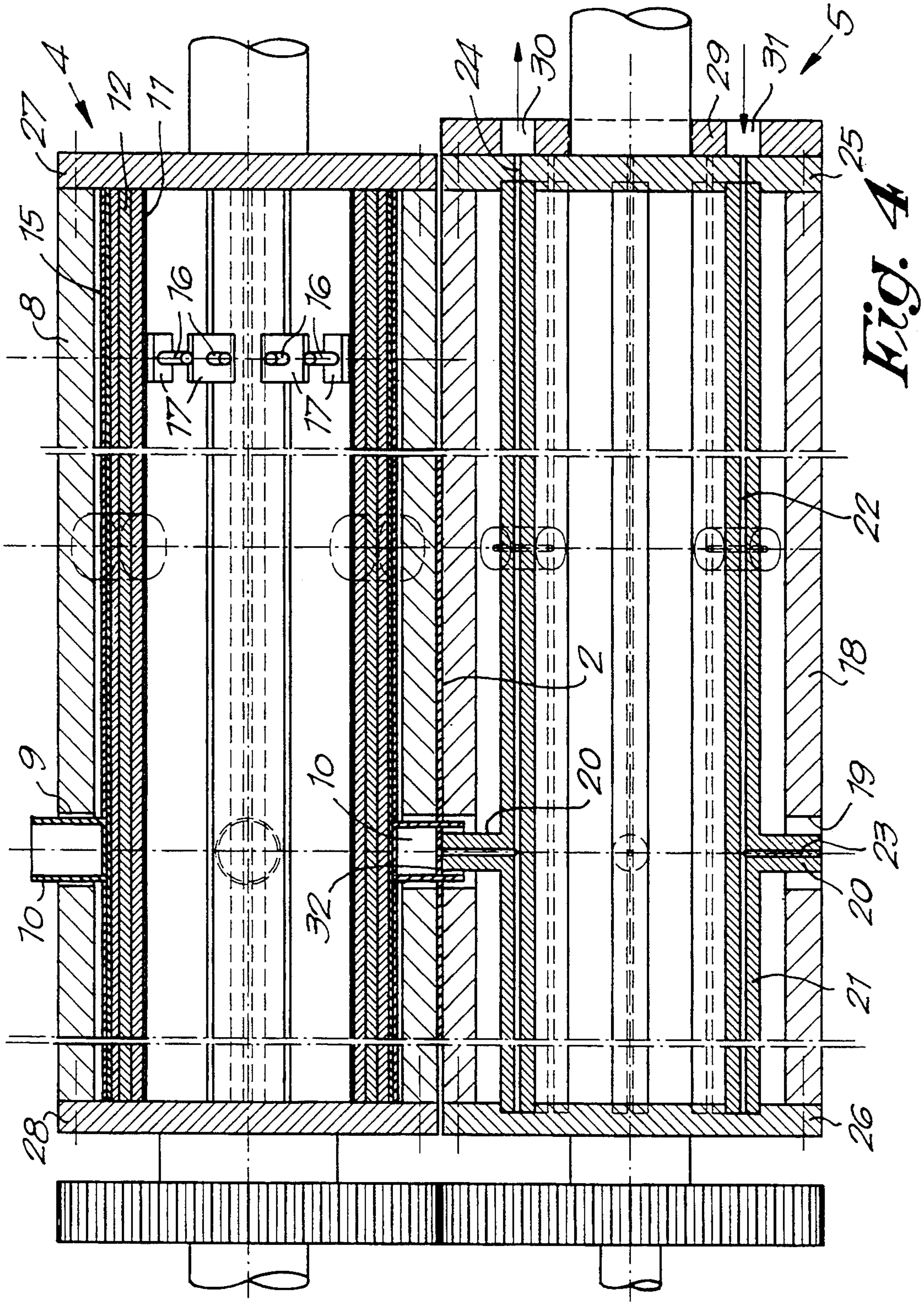
FIG. 4 shows a section according to line IV—IV in FIG. 3.

FIG. 1 is a schematic representation of a device for applying the method according to the invention, whereby the main elements of this device consist of a supply reel 1 containing foil material 2 to be treated, a brake cylinder 3 for tightening the foil material 2, cooperating rollers 4–5 for providing, in the foil material 2, relatively large perforations, for the removal from the foil material 2 of the cut-out discs respectively, whereby the foil material 2 is led around the roller 5, and finally a drive roll 6 for the foil material 2 which has as a task to tighten the latter in cooperation with the brake cylinder 3 until the perforated foil material is wound on a supply reel 7.

Naturally, the different cylinders are each driven in a suited manner so as to make the different cylinders operate synchronously.

The cylinder 4 according to the invention mainly consists of a thick-walled pipe 8 in which several holes 9 are provided which are arranged according to a specific configuration, for example in this case according to parallel rows with holes 9 provided in a zigzag line.

Through each hole 9 formed in this manner is placed a bush 10 whose diameter is smaller than the diameter of the hole 9, such that there is no contact between this bush 10 and the hole 9.

The bushes 10 are preferably made of copper and are fixed, per row, for example by means of welding, on a common lath 11, for example also made of copper, in which an electrical resistance 12 is provided which is connected to a circuit in a suitable manner, for example by means of electrical conductors 13–14.

On each lath 11 is provided a strip of insulation material 15 in which holes are provided for the bushes 10, one and other such that, when the laths 11 are fixed to the inner wall of the pipe 8 by means of suited screws 16 with clamping nuts 17, there is no thermal contact between the laths 11 and the cylinder 4.

The cylinder 5 according to the invention also consists of a thick-walled pipe 18 in which holes 19 are provided whose diameter is preferably equal to the diameter of the holes 9 in the pipe 8, and whereby these holes 19 are provided in the pipe 18 according to the same configuration as the configuration of the holes 9 in the pipe 8.

Through each hole 19 in the pipe 18 is provided a nipple 20 whose free end coincides with the circumference of the pipe 18 and whereby the nipples of one and the same row are fixed on a common duct 21 which may consist of a suited pipe whose passage 22 is connected to the passages 23 in the nipples 20 concerned.

This duct 21 at one end of the cylinder 5 opens into a passage 24 in the flange 25 of cylinder 5, in which also the ends of the pipes 21 are caught.

The other ends of the pipes 21 are caught in a similar way in a flange 26, whereby these flanges 25 and 26 are fixed to the pipe 18 by means of screws or such which are not represented.

Besides, this is also the case for cylinder 4 which is provided with flanges 27–28 at each end Against the flange 25 of cylinder 5 is also erected a stationary flange 29 in which two circular grooves 30 and 31 are provided.

The above-mentioned circular grooves 30 and 31 extend over an angle of 90 degrees and are diametrically opposed to one another with the suction groove 30 on top.

The working of the device as described above is very simple and as follows.

The foil material 2 which, as a result of the cooperation of the cylinders 3 and 6, is moved in a taught manner through the device between the cylinders 4 and 5, where it first makes contact with a specific row of bushes 10 which are heated at a suited temperature, such that they can penetrate in the foil material 2.

During said movement, a corresponding row of nipples 20 has been placed opposite the groove 30 via which the cylinder 5 is connected to a vacuum pump or such, one and other such that, when the nipples 20 concerned are placed opposite the foil material, the discs 32 which have been released in the meantime by the bushes 10 concerned are sucked to the nipples 20.

During the movement of the cylinders 4 and 5, the bushes 10 will so to say penetrate in the foil 2 like a heated knife, after which these bushes 10 end up in the holes 19 in the pipe 18 of the cylinder 5, and thus the foil 2, in particular the discs 32, make contact with the nipples 20.

As the cylinders 4 and 5 further rotate, the bushes 10 will again leave the holes 19, whereby the discs 32 are removed with great certainty from the foil 2, as these discs 32 remain sucked onto the nipples 20 for quite some time.

As the cylinder 5 rotates still further, the passage 24 in flange 25 will go past the groove 30, such that the suction on the discs 32 drops out and, as of then, they can freely fall in a collector bin which is not represented.

In case said discs would still remain stuck to the nipples 12 concerned, the groove 31 is provided via which compressed air is supplied through the passage 24 into the nipples 20 concerned, as a result of which the discs 32 are blown away with great certainty.

It is clear that a device is obtained in this manner with which it is possible to provide relatively large perforations in very thin foil material, irrespective of the specific characteristics of the latter, with the absolute certainty that these perforations are arranged in the right manner and that the pushed-out discs 32 are removed from the foil 2 with great certainty.

It is also clear that the size of the perforations can be altered by selecting other cylinders 4, 5 respectively whose bushes 10 have the shape and dimensions of the required perforation.

The electrical connection of the resistors 12 and the connection of the devices for bringing about an underpressure and overpressure are not represented in the figures, since they can be mace in various known manners.

Naturally, the method, device respectively, according to the invention is not limited to the embodiment described as an example and represented in the accompanying drawings, but can be made in all sorts of variants.

We claim:

1. A device for perforating foil comprising:

first and second cylinders, said second cylinder being provided with a plurality of spaced holes;

means for rotating said first and second cylinders in relation to one another;

means to cut-out discs from the foil during rotation of the cylinders, said cut-out means including bushes protruding from an outer wall of said first cylinder, said bushes being received in the holes provided in the second cylinder and shaded and dimensioned so as to correspond to the desired shape and dimensions of the perforations, said cut-out means further including means for heating the foil and said bushes; and means for grasping the cut-out discs, said grasping means including nipples positioned within the holes provided in said second cylinder, a vacuum source and means for connecting the nipples to the vacuum source during a predetermined portion of the rotation of the cylinders.

2. The device according to claim 1, further comprising means for removing said discs, said removing means including a compressed air source connected to said nipples, said vacuum source and said compressed air source being successively connected to said nipples during rotation of said second cylinder.

3. The device according to claim 2, wherein the bushes extend through holes provided in the outer wall, said holes having associated diameters that are larger than the corresponding dimensions of the bushes, said bushes being arranged in rows with each of the bushes in a single row being fixed on a common lath, said heating means including a plurality of heating elements each of which is connected to a respective said lath.

4. The device according to claim 3, wherein the bushes are fixed in the first cylinder by means of mechanical fasteners, said device further including a layer of thermal insulation material between an inner wall of the first cylinder and each said lath.

5. The device according to claim 2, wherein the holes provided in the second cylinder are significantly larger than the corresponding dimensions of the bushes such that, as the first and second cylinders are rotated in relation to one another, the bushes can move freely in and out of said holes.

6. The device according to claim 2, wherein each of said nipples is carried by a longitudinally extending pipe of said second cylinder and includes a first passage which is connected to a central duct in the pipe, said duct being connected to a second passage formed in a flange provided at a longitudinal end of said second cylinder.

7. The device according to claim 6, wherein each of said nipples is dimensioned significantly smaller than the inner dimensions of an associate one of said bushes.

8. The device according to claim 6, wherein said flange is positioned adjacent a second fixed flange in which two circular grooves are provided, one of said grooves being connected to said vacuum pump and the other said grooves being connected to said compressed air source.

9. The device according to claim 8, wherein each of said grooves extends about an angle of 90° in said fixed flange, said grooves being diametrically opposed to one another with the groove connected to the vacuum pump being positioned above the groove connected to the compressed air source.

10. A device for perforating foil comprising:

first and second cylinders, said second cylinder being provided with a plurality of spaced holes;

means for rotating said first and second cylinders in relation to one another;

means to cut-out discs from the foil during rotation of the cylinders, said cut-out means including bushes protruding from an outer wall of said first cylinder, said bushes being received in the holes provided in the second cylinder and shaped and dimensioned so as to correspond to the desired shape and dimensions of the perforations, said cut-out means further including means for heating the foil and said bushes, said holes having associated diameters that are larger than the corresponding dimensions of said bushes, said bushes being arranged in rows with each of the bushes in a single row being fixed on a common lath, said heating means including a plurality of heating elements each of which is connected to a respective said lath; and means for grasping the cut-out discs, said grasping means being carried by said second cylinder.

11. The device according to claim 10, wherein the bushes are fixed in the first cylinder by means of mechanical fasteners, said device further including a layer of thermal insulation material between an inner wall of the first cylinder and each said lath.

12. A method of perforating foil comprising:

providing a first cylinder to which heated bushes are fixed and from which the bushes protrude;

arranging the first cylinder in relation to a second rotatable cylinder in which holes are provided within which the protruding bushes extend during rotation of the cylinders;

placing nipples within each of the holes;

cutting out subsequent series of discs by arranging a foil between the first and second cylinders and rotating the first cylinder with the heated bushes to cause the heated bushes to extend through the foil and into the holes in the second cylinder;

grasping the cut-out discs by connecting the nipples to a vacuum source during a predetermined portion of the rotation of the cylinders; and removing said discs from the foil by connecting the nipples to a source of compressed air during another predetermined portion of the rotation of the cylinders to thereby blow the discs from the foil.

13. A method for perforating foil according to claim 12, further comprising:

arranging the holes in the second cylinder with associated diameters that are larger than the corresponding dimensions of the bushes;

arranging the bushes in rows with each of the bushes in a single row being fixed on a common lath; and heating the bushes by providing a plurality of heating elements each of which is connected to a respective said lath.

14. A method for perforating foil according to claim 12, further comprising:

arranging each of said nipples on a longitudinally extending pipe of said second cylinder;

connecting a first passage of each of said nipples to a central duct within the pipe; and connecting the central duct to a second passage formed in a flange provided at a longitudinal end of said second cylinder.

* * * * *